Aug. 1, 1939.          H. KÜPPENBENDER          2,168,263
ROLL FILM CAMERA
Filed Feb. 16, 1939          2 Sheets-Sheet 1

Inventor
Heinz Küppenbender
BY B. Singer & F. Stern
Attys.

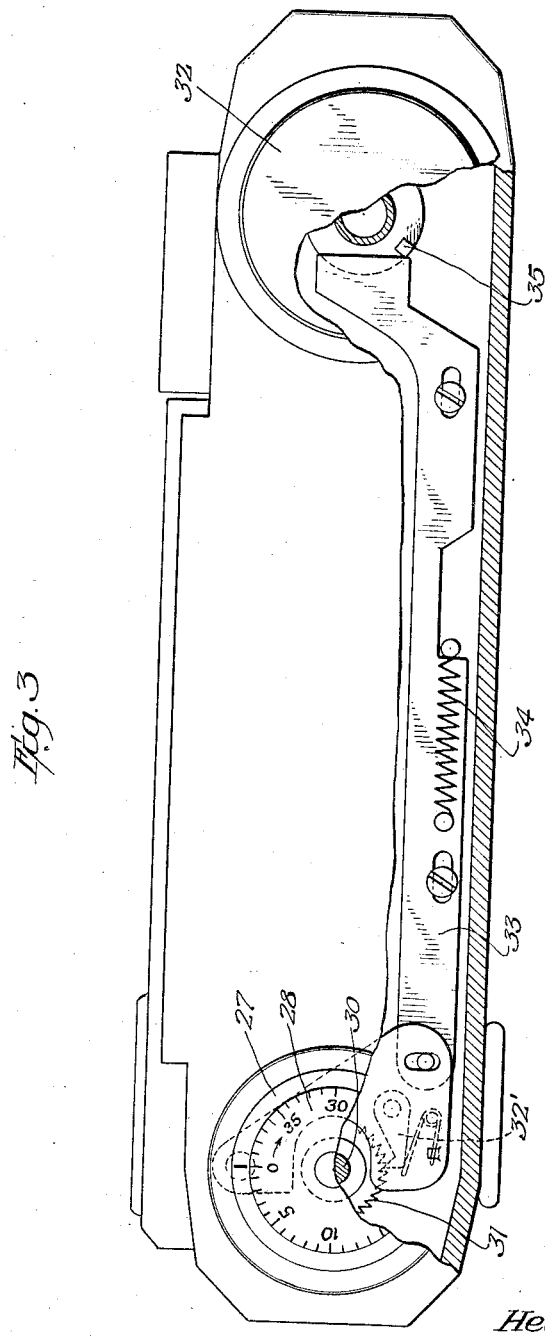

Patented Aug. 1, 1939

2,168,263

UNITED STATES PATENT OFFICE 2,168,263

ROLL FILM CAMERA

Heinz Küppenbender, Dresden, Germany, assignor to Zeiss Ikon Aktiengesellschaft, Dresden, Germany Application February 16, 1939, Serial No. 256,810
In Germany February 8, 1938

8 Claims. (Cl. 95—44)

The invention relates to improvements in rollfilm cameras and particularly is directed to rollfilm cameras provided with a film rewinding device and an inbuilt range finder of the mirror base type.

It is an object of the invention to operatively connect the manually operable film rewinding member, which is mounted on an outer wall of the camera casing, by means of a gearing arranged around the glass prism bar forming the mirror base of the range finder, with the rotatable film spool engaging member.

Another object of the invention is to provide the camera with a recessed film rewinding knob in which is mounted a device for counting the number of exposures taken with the camera.

Other objects of the invention will be apparent or will be specifically pointed out in the following description forming a part of this specification.

Referring to the drawings:

Figure 3 is a top plan view of the camera, partly broken away to show the exposure counter mechanism.

Figure 1:
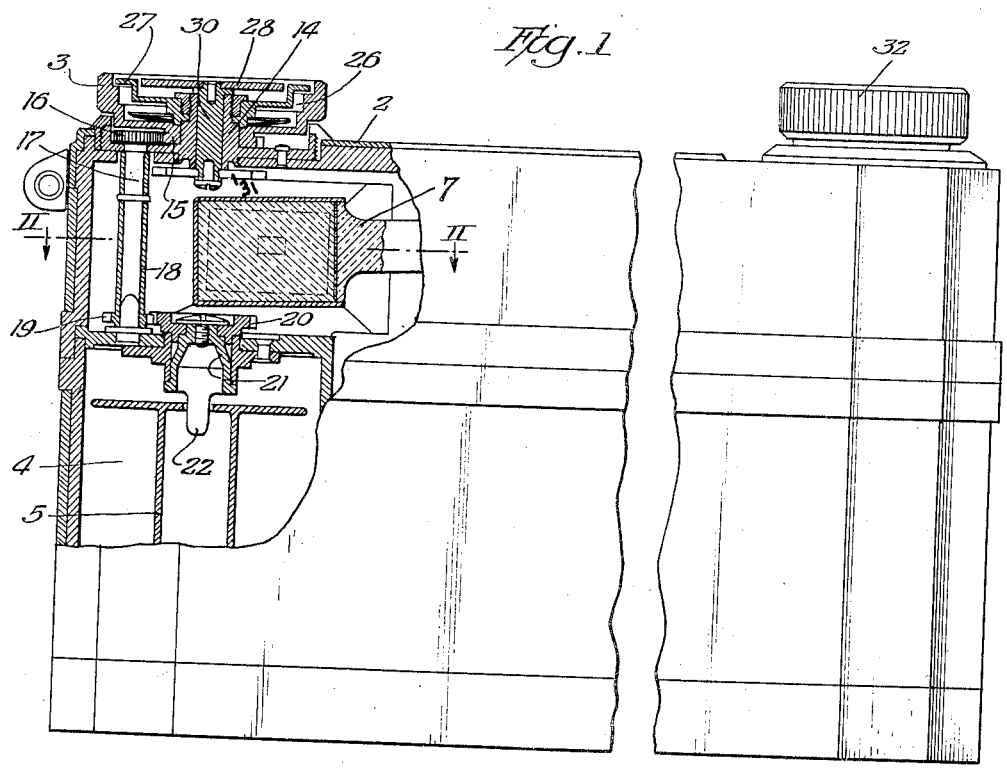
Figure 1 is a rear elevation view of a rollfilm camera, partly in section on the line I—I of Fig. 2 to illustrate the novel film rewinding device.
Figure 2:
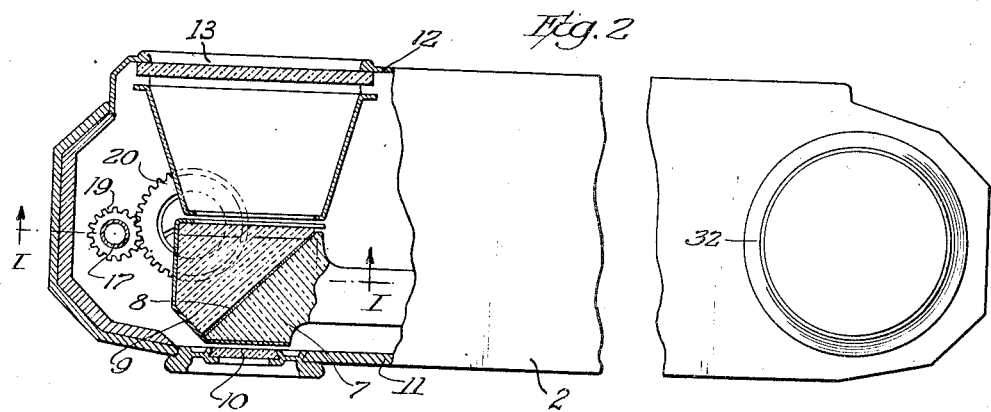
Figure 2 is a top plan view of the camera partly in section on the line II—II of Fig. 1.

The drawings illustrate by way of example a rollfilm camera employing standard motion picture film as negative material. The camera casing 1 has a relatively narrow top wall 2, at one end of which is mounted a film rewinding knob 3. The camera casing 1 is provided in customary manner at one end with a compartment 4 for receiving a film supply spool 5 and at the other end with a similar compartment for the film take-up spool (not shown), adapted to be operated by the knob 32.

A range finder of the mirror base type is mounted in the upper portion of the camera casing 1, below the top wall 2. In the present case the range finder serves also as a view finder, in a manner well known in the art.

It will be noted that one end of the glass prism 7 forming the base of the range finder extends so far to the left hand side of the camera that it comes to lie directly below the film rewinding knob 3 on the top wall 2 of the camera casing 1. This end of the glass prism 7 is provided with an inclined end face having thereon a semi-transparent reflecting layer 8 to which a prism 9 is cemented. The image appearing on the semitransparent reflecting layer 8 is observed through a viewing ocular 10 in the rear wall 11 of the camera casing 1. The front wall 12 of the camera casing 1 is provided with the customary finder window 13 in axial alinement with the viewing ocular 10. The film winding knob 3 is rotatably mounted on a tubular bearing stud 14 attached fixedly to the top wall 2 of the casing 1. A gear 15 on the lower end of the knob 3 meshes with a gear 16 on the upper end of a vertical shaft 17 which is fixedly connected with a tubular shaft 18. The lower end of the tubular shaft 18 has attached thereto a gear 19 meshing with a gear 20 on a rotatably mounted stub shaft 21, whose lower end 22 is non-circular and is adapted to engage a correspondingly formed axial aperture in the film supply spool 5. The gears 15, 16, 18, 20 are arranged in such manner in the casing 1 that the telescoping shafts 17, 18 will be positioned at a distance laterally from the nearest end of the mirror base 7, 8, 9 and thus do not interfere with the latter. While the rewinding knob 3 and the stub-shaft 21 are arranged in axial alinement with each other, this is not absolutely necessary. When the design of the camera should make it more convenient, the stub-shaft 21 and knob 3 may also be arranged out of axial alinement or the axes of the knob 3 and the stubshaft may be arranged at an angle to each other, without changing the scope of the invention.

With reference to Fig. 1, it will be noted that the upper end of the film rewinding knob 3 is provided with an axial recess 26 in which an exposure counter 27, 28 is mounted, which is operatively connected with a shaft 30 extending through the bore of the tubular bearing stud 14.

The exposure counter consists of a disc shaped member 27 which is provided with an index. A second disc shaped member 28 is provided with scale divisions and is mounted in coaxial relation to the first named disc shaped member 27 on an axle 30. This axle 30 is provided at its lower end with a toothed wheel 31 which in turn is operatively connected with and is engaged by a spring controlled racket 32'. This racket is fixed on a lever 33 which opposite to the influence of a spring 34 is moved in a direction parallel to the said lever by means of an abutment 35 which is operatively connected with the film winding and shutter tensioning means, this movement of the lever 33 resulting from the rotation of these means. Thus the toothed wheel 31 will be rotated for one tooth's distance by means of the racket 32 and hereby the counter disc 28 will be adjusted to the next scale division.

What I claim is:

1. In a rollfilm camera, the combination with a camera casing having a top wall, of a film rewinding member on said top wall, a rotatably mounted stub-shaft within said camera casing adapted to drivingly engage a film spool when the latter is inserted in said casing, said stub-shaft and rewinding member being spaced from each other, a range finder within said camera casing below the top wall thereof, said range finder including a prism bar forming the mirror base thereof, one end of said prism bar being positioned in the space between said rewinding member and said film spool engaging stub-shaft, and means drivingly connecting said rewinding member and said stub-shaft and extending around said end of said prism bar.

2. In a rollfilm camera, the combination with a camera casing having a top wall, of film rewinding means and a base range finder, said film rewinding means including a manually rotatable knob on said top wall, a rotatably mounted stub-shaft within said casing and spaced from said knob, and adapted to drivingly engage a film spool inserted in said casing, and means drivingly connecting said knob and said stub-shaft, said range finder including a prism bar arranged within said camera casing below said top wall and forming a mirror base, one end of said prism bar being positioned within the space between said knob and said stub-shaft, said drivingly connecting means extending around said end of said prism bar.

3. In a rollfilm camera, the combination with a camera casing having a top wall, of film rewinding means and a base range finder, said film rewinding means including a manually rotatable knob on said top wall, a rotatably mounted stub-shaft within said casing and spaced from said knob, and adapted to drivingly engage a film spool inserted in said casing, and means drivingly connecting said knob and said stub-shaft, said range finder including a prism bar arranged within said camera casing below said top wall and forming a mirror base, one end of said prism bar being positioned within the space between said knob and said stub-shaft, said drivingly connecting means extending around said end of said prism bar and including a shaft mounted parallel to said stub-shaft, and gears connecting the ends of said shaft with said knob and stub-shaft respectively.

4. In a rollfilm camera, the combination with a camera casing having a top wall, of film rewinding means and a base range finder, said film rewinding means including a manually rotatable knob on said top wall, a rotatably mounted stub-shaft within said casing, said stub-shaft being axially spaced from and in axial alinement with said knob, and adapted to drivingly engage a film spool inserted in said casing, and means drivingly connecting said knob and said stub-shaft, said range finder including a prism bar arranged within said camera casing below said top wall and forming a mirror base, one end of said prism bar being positioned within the space between said knob and said stub-shaft, said drivingly connecting means extending around said end of said prism bar.

5. In a rollfilm camera, the combination with a camera casing having a top wall, of film rewinding means and a base range finder, said film rewinding means including a manually rotatable knob on said top wall, a rotatably mounted stub-shaft within said casing, said stub-shaft being axially spaced from and in axial alinement with said knob, and adapted to drivingly engage a film spool inserted in said casing, and means drivingly connecting said knob and said stub-shaft, said range finder including a prism bar arranged within said camera casing below said top wall and forming a mirror base, one end of said prism bar being positioned within the space between said knob and said stub-shaft, said drivingly connecting means extending around said end of said prism bar and including a shaft mounted parallel to said stub-shaft, and gears connecting the ends of said shaft with said knob and stub-shaft respectively.

6. In a rollfilm camera, the combination with a camera casing having a top wall, of a film rewinding member on said top wall, an exposure counting means mounted coaxially with said film rewinding member, a rotatably mounted stub-shaft within said camera casing adapted to drivingly engage a film spool when the latter is inserted in said casing, said stub-shaft and rewinding member being spaced from each other, a range finder within said camera casing below the top wall thereof, said range finder including a prism bar forming the mirror base thereof, one end of said prism bar being positioned in the space between said rewinding member and said film spool engaging stub-shaft, and means drivingly connecting said rewinding member and said stub-shaft and extending around said end of said prism bar.

7. In a rollfilm camera, the combination with a camera casing having a top wall, of film rewinding means and a base range finder, said film rewinding means including a manually rotatable knob on said top wall, a rotatably mounted stub-shaft within said casing and spaced from said knob, and adapted to drivingly engage a film spool inserted in said casing, and means drivingly connecting said knob and said stub-shaft said range finder including a prism bar arranged within said camera casing below said top wall and forming a mirror base, one end of said prism bar being positioned within the space between said knob and said stub-shaft, said drivingly connecting means extending around said end of said prism bar, said manually rotatable knob being provided with an axial recess, and an exposure counting means being mounted in said recess.

8. In a rollfilm camera, the combination with a camera casing having a top wall, of film rewinding means and a base range finder, said film rewinding means including a manually rotatable knob on said top wall, a rotatably mounted stub-shaft within said casing and spaced from said knob, and adapted to drivingly engage a film spool inserted in said casing, and means drivingly connecting said knob and said stub-shaft, said range finder including a prism bar arranged within said camera casing below said top wall and forming a mirror base, one end of said prism bar being positioned within the space between said knob and said stub-shaft, said drivingly connecting means extending around said end of said prism bar and including a shaft mounted parallel to said stub-shaft, and gears connecting the ends of said shaft with said knob and stub-shaft respectively, said manually rotatable knob being provided with an axial recess, and an exposure counting means being mounted in said recess.

HEINZ KÜPPENBENDER.